3,149,972
DIAZO AND RESINOUS COUPLER PRINTING PLATES FOR PHOTOMECHANICAL REPRODUCTION

Clifford E. Herrick, Jr., Chenango Forks, and Peter T. Woitach, Jr., Binghamton, N.Y., assignors to General Aniline & Film Corporation, New York, N.Y., a corporation of Delaware
No Drawing. Filed Aug. 16, 1960, Ser. No. 49,853
9 Claims. (Cl. 96—75)

This invention relates to printing plates used in photomechanical reproduction and to dye-forming components used therein. More particularly this invention relates to a printing plate for mechanical reproduction in which the ink-receptive surface is an azo dye formed by the reaction of a diazo compound with a high molecular weight coupling component containing, before coupling, several hundred coupling functions.

The use of azo dyes as ink-receptive lithographic images for direct positive offset plates has been suggested before. French Patent 904,255 discloses a process for preparing printing plates on aluminum whose surface has been rendered more or less porous and wettable by chemical or mechanical means. The surface thus prepared is coated with an aqueous solution containing a low molecular weight diazo compound whose photoproduct can be removed by washing, a low molecular weight coupling component, and a stabilizing acid. After exposing the coated plate beneath a positive original, the azo dye image is developed with ammonia fumes and the plate is washed with water to remove the residual material in the light-struck areas.

In this same patent there is also disclosed the use of water-insoluble diazooxides, specifically the ethyl ester of 2-diazo-1-naphthol-5-sulfonic acid, for producing positive-working photoplates on porous aluminum without recourse to the use of coupling components. In this case, the diazo compound is itself more or less ink-receptive, and, after exposure as above and removal of the photoproduct by washing with water, serves as the printing image.

The dyes formed using the diazo compound and coupling component disclosed above are lacking in ink-receptivity, and are friable. The plate, therefore, has a limited life on the press. In order to prevent precoupling it is necessary to add an acid, such as tartaric acid, to the layer and under such circumstances the image appears to become honeycombed and is especially friable and weak. The plates prepared with diazooxide as mentioned above are also unsatisfactory since the ink-receptive diazo image deteriorates under printing conditions on the offset press.

German Patents Nos. 875,437 and 893,748 disclose the use of water-insoluble diazooxides derived from amides or esters of the sulfonic acids of 1,2-aminonaphthols and 1,2-aminophenols in conjunction with low molecular weight coupling components as above. German Patent No. 854,890 discloses the use of similar diazooxides without coupling components. The processes as disclosed in these patents are based upon the earlier French patent cited above, differing only in an increase of the molecular weight of the diazooxides used, and in the use of an alkaline after-treatment following exposure to remove the photoproduct from the exposed areas and render these areas water receptive.

The press life of plates prepared according to the German patents mentioned above leaves much to be desired when compared to other positive processes in use today. Thus, using for instance the positive-working, so-called, deep-etch process, one expects to obtain a plate which will produce on the order of 100,000 or more copies. Diazooxide images, on the other hand, produce only one-tenth or less of this number.

One of the most important failings of all of the methods employed heretofore in the production of direct positive lithographic images occurs when an attempt is made to utilize a hydrophilic colloid, e.g., surface-saponified cellulose acetate, the copolymer of maleic anhydride with a vinyl ether such as vinyl methyl ether or a colloid-bound porous clay as an image carrier. Such underlayers are especially interesting commercially since the primary support may be an inexpensive wet strength paper. We have found that when such layers are used, it is of first importance that the image be maintained in an essentially undiluted form in the very top surface region of the carrier layer. Almost the slightest degree of penetration of the image into the hydrophilic underlayer and the consequent dilution of its ink-receptive character which inevitably occurs, results in a marked falling off in the ability of the image to pick up ink. Or if the photoproduct is ink-receptive or prone to tan, a negative image frequently will result in place of the expected positive image. In the case of water-soluble diazos used together with a coupler, penetration is extreme and if the diazo component is sufficiently large, a negative image results due to tanning, and a very poor ink-receptivity in the dye-containing areas is produced. When large water-insoluble diazooxide molecules are used on a water receptive colloid substratum, great difficulty is frequently encountered in removing the ink-receptive photodecomposition product with the result that the plate is very likely to show tone in the non-image areas, since the alkaline after-treatment heretofore employed for such diazooxide layers is not sufficiently effective in removing all of the photodecomposition products. Furthermore, many colloids are badly damaged by the alkaline treatment. If an attempt is made to utilize the ink-receptive azo dye image in conjunction with a colloid underlayer and a water-insoluble diazo, it is frequently found that the coupler components heretofore used tend to migrate into the colloid and away from the diazo to the point that the shelf storage life of the plate under moist conditions is unsatisfactory since no image will be formed after short aging, and/or tone may occur in the non-image areas.

In order to produce an ink-receptive dye image of good mechanical strength and a high degree of ink-receptivity, it is important that the dye molecule have a high molecular weight. Such dyes can be produced if a coupler molecule is capable of coupling more than once. The couplers of our invention are capable of coupling several hundred times.

It is an object of this invention to provide a printing plate suitable for use in photomechanical reproduction in which the image is composed of a tough resinous film of polymeric character.

It is a further object of this invention to provide a printing plate suitable for use in photomechanical reproduction having a colloid layer thereon and a coating of dye components on the surface of said layer, which components do not penetrate said layer when placed thereon and upon aging.

It is a still further object of this invention to provide a printing plate suitable for use in photomechanical reproduction having thereon a layer comprising a mixture of a diazo compound of relatively low molecular weight and a coupling compound of high molecular weight having several hundred coupling fuctions.

Another object of this invention is to provide a printing plate suitable for use in photomechanical reproduction containing dye components which produce an image capable of withstanding the action of organic solvents used during development.

Still another object of this invention is to provide novel diazo compounds and novel compounds capable of coupling therewith.

Other objects and advantages of this invention will appear to those skilled in the art from the detailed description thereof appearing below.

We attain these objects by the use of a layer containing a light-sensitive diazo compound and a resinous coupler of very high molecular weight. Thus the final character of the image is determined largely by the properties of the coupler. We find it especially advantageous to utilize diazo compounds which contain two or more diazo groups per molecule, since under these conditions the azo dye formed on development consists of a partially cross-linked, highly insoluble polymer. It is further advantageous if the resinous coupler be entirely insoluble in water and still a further advantage ensues if the diazo compound itself be water-insoluble. The diazo compounds which are especially advantageous due to their water insolubility and low coupling activity are those deriving from the naphthalenediazooxides. We can obtain negative-working plates with our process through the use of diazosulfonates, especially diazosulfonates containing two or more diazosulfonate functions per molecule. Such diazosulfonates are especially suitable when used in the form of solvent-soluble, water insoluble organic salts. In the event that a polymeric coupler is solvent soluble and a bifunctional diazo compound is employed, it is frequently possible to employ a properly chosen organic solvent mixture for the removal of the photodecomposition product. This procedure is especially advantageous in conjunction with layers coated on a substratum consisting of a water receptive planographic colloid since it permits removal of the photodecomposition product and uncoupled ink-receptive coupling polymer in a gentle way without damage to the hydrophilic underlayer.

By the use of the dye components of our invention, a clean removal of the photodecomposition products in the non-image areas, after exposure of the plate, may be accomplished by means of organic solvents instead of aqueous alkalies. These organic solvents do not unduly affect the image areas and remove all traces of background tone without damaging the carrier substratum. Our process produces a highly visible azo dye image and due to the resinous character of the light-sensitive layer there is no migration of the dye components. We may employ only a small amount of stabilizing acid, thereby imparting a long shelf life to the plate. The diazo compounds used in our process have a very high thermal stability. The substratum used with our plate may be a resinous composition which is hydrophobic and ink-receptive, but which has the property of becoming hydrophilic. One such resinous composition which we have found to be suitable for use as a substratum is a mixture of cellulose acetate and a copolymer of maleic anhydride, such as methyl vinyl ether, ethyl vinyl ether, 2-chloro:ethyl vinyl ether, isobutyl vinyl ether, n-butyl vinyl ether, 2-ethoxy ethyl vinyl ether, 2-methoxy ethyl vinyl ether and the like.

Among the high polymeric coupling compounds we have found useful for our purpose, the following are listed:

(1) Polyvinyl acetoacetatae
(2) Acetoacetic ester of hydroxyethyl cellulose
(3) Polyvinyl acetate-acetoacetate and
(4) The reaction product of PVM/MA and

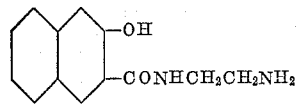

These are but examples of the coupling compounds found useful. Many other high polymeric coupling compounds may be used.

The following are examples of the diazo compounds which we may use with a high polymeric coupling compound to produce the novel plate of our invention:

(5) 1,3-di-o-tolylguanidine-p-ethoxybenzenediazosulfonate
(6) 1,3-di-o-tolylguanidine-3-chloro-4,6-dimethoxy-benzenediazosulfonate
(7) 1,3-di-o-tolylguanidine-4,4'-biphenylbisdiazosulfonate
(8) p-(naphthalene-2,1-diazooxide-5-sulfonamido)-phenyl-2,1-diazooxide-5-sulfonate
(9) Phenyl naphthalene-2,1-diazooxide-5-sulfonate
(10) 4,4'-bis(naphthalene-2,1-diazooxide-5-sulfonamido)-biphenyl (11)

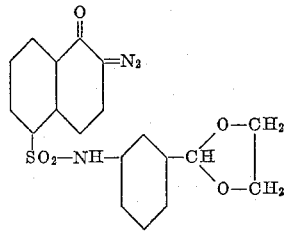

(12) N,N'-ethylenebis-(p-ethylaminobenzenediazonium chloride-zinc chloride complex)
(13) N,N'-trimethylenebis-(p-2-hydroxyethylamino-benzenediazonium chloride-zinc chloride complex)
(14) p,p'-(1,4-piperazylene)bis(benzenediazonium chloride-zinc chloride complex)
(15) 2,2' - ethylenedioxybis - (4-diethylaminobenzenediazonium chloride-zinc chloride complex)

(16)

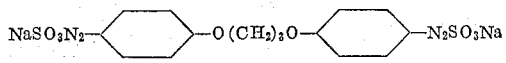

The diazo sulfonates and the diazooxides listed above are soluble in organic solvents and the bifunctional diazo compounds are soluble in water.

The following examples illustrate the methods used in preparing certain of the compounds listed above and the method of preparing our novel plate. It is to be understood, however, that these examples are given by way of illustration and not by way of limitation.

The following four examples show methods of preparing our novel coupling compounds.

EXAMPLE I

Polyvinyl acetoacetate was prepared by dissolving 10 g. of polyvinyl alcohol in 150 ml. of dimethyl formamide, heating the mixture on a steam bath, adding a crystal of p-toluene-sulfonic acid and thereafter adding 32.3 g. of 2,2,4-trimethyl-6-keto-1,3-dioxane over a period of 15 minutes. Heating was continued for three hours, resulting in a brown solution. The solution was then cooled and the product precipitated with cold water. After washing with water and recrystallizing from an acetone-water solution, the product was vacuum dried over NaOH.

EXAMPLE II

To prepare the acetoacetic ester of hydroxyethyl cellulose, 20 g. of hydroxyethyl cellulose was suspended in 300 ml. of dimethyl formamide, and 30 g. of 2,2,4-trimethyl-6-keto-1,3-dioxane was added, along with a few crystals of p-toluene sulfonic acid. The mixture was heated at 100° C. for seven hours. The resulting brown, homogeneous solution was poured on 1.5 liters of benzene; the precipitate was dissolved in dimethyl formamide, re-precipitated from ethanol, then washed with ethanol. The fibrous product was vacuum dried.

EXAMPLE III

To prepare polyvinyl acetate-acetoacetate, 20 g. of polyvinyl alcohol-acetate (47% free hydroxyl) was mixed with 22 g. of 2,2,4-trimethyl-6-keto-1,3-dioxene in dimethyl formamide, along with a few crystals of p-toluene-sulfonic acid. The mixture was heated at 100° C. for three hours, after which the resulting orange solution was cooled and poured on three liters of cold water. The resulting pale yellow, rubber-like precipitate was collected, washed thoroughly with water and vacuum dried. Yield=25.6 g.

EXAMPLE IV

To prepare the reaction product of PVM/MA and

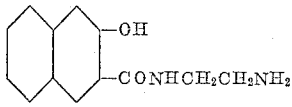

a mixture of 17.8 g. N-2-aminoethyl-3-hydroxy-2-naphthamide and 80 ml. pyridine was stirred with a solution of 5.2 g. PVM/MA in 83 ml. pyridine. After standing overnight the mixture was added to 800 ml. cold hydrochloric acid, about 12%. Next the rubbery mass which precipitated was collected and dissolved in 100 ml. of acetone by shaking. The product was precipitated from this solution by addition to a stirred mixture of 1000 ml. of water and 10 ml. of hydrochloric acid, about 20%. The isolated mass was frozen with solid carbon dioxide, pulverized, and dissolved in 200 ml. of water and 10 ml. of concentrated ammonium hydroxide. This solution was added to about 500 ml. of cold hydrochloric acid, about 2%, with stirring. After refrigeration overnight the purified product was filtered, washed with water, and dried under reduced pressure. The yield was 7.3 g.

The following examples show methods of preparing our novel diazo compounds:

EXAMPLE V

*1,3-Di-o-Tolylguanidine p-Ethoxybenzenediazosulfonate*

To prepare this diazo compound, 5.5 g. of freshly distilled p-phenetidine was added with stirring to a mixture of 13.2 ml. of HCl and 30 g. of ice. To this solution, 2.95 g. of $NaNO_2$ in 6 ml. of water was added with stirring over a period of ¾ hours. The stirring was continued for ½ hour, and excess nitrite destroyed with sulfamic acid. Seven grams of $NaHCO_3$ were added to bring the pH to 7.5, the solution was cooled to 0° C., and a solution of 5.04 g. of $Na_2SO_3$ in 18 ml. of water added. The yellow solid was separated by filtration, washed, and dried. Yield=9.38 g.

The salt was prepared by dissolving 175 g. of p-ethoxybenzenediazosulfonate in warm, dilute acetic acid, adding an acetic acid solution of di-o-tolylguanidine, cooling to 20° C., and filtering off the yellow precipitate, which was slurried twice with water, refiltered, and dried in vacuo over NaOH. Yield=291.1 g.

EXAMPLE VI

*1,3-Di-o-Tolylguanidine 3-Chloro-4,6-Dimethoxybenzenediazosulfonate*

To prepare this compound 30 g. of 3-chloro-4,6-dimethoxybenezenediazosulfonate was dissolved in dilute acetic acid. After adding an acetic acid solution of 24 g. of 1,3-di-o-tolyl guanidine, a red oil separated, which crystallized after several days' standing. After filtering, washing and vacuum drying, the yield was 37.0 g.

EXAMPLE VII

*1,3-Di-o-Tolylguanidine-4,4'-Biphenylbisdiazosulfonate*

To prepare this compound, 18.4 g. of benzidine was dissolved in dilute HCl and heated to 70° C. After cooling, and acidifying to Congo red acidity, the amine was diazotized with sodium nitrite. The diazo solution was adjusted to pH=6 with sodium bicarbonate, and the diazo sulfonate formed by adding $Na_2SO_3$. After filtering, the damp diazo sulfonate was treated with an acetic acid solution of 1,3-di-o-tolylguanidine, refrigerated, filtered and vacuum dried.

EXAMPLE VIII

*p-(Naphthalene-2,1-Diazooxide-5-Sulfonamido)-Phenyl-2,1-Diazooxide-5-Sulfonate*

To prepare this compound, 27.0 g. of naphthalene-2,1-diazooxide-5-sulfonyl chloride and 5.0 g. of p-aminophenol were dissolved in 150 ml. of dioxane and 50 ml. of water. To this solution was added 35 ml. of 3 N-$Na_2CO_3$ solution. The solution was then heated to 50–55° C. for ½ hour, allowed to cool, poured into water, and acidified with dilute HCl. A red solid separated which was filtered, recrystallized from aqueous ethanol, and vacuum dried. Yield=7.1 g.

The sulfonyl chloride used as starting material was prepared by adding 14 g. of naphthalene-2,1-diazooxide-5-sulfonic acid portionwise to 100 ml. of chlorosulfonic acid and adding Dry Ice as needed to maintain the temperature at 30–45° C. After addition of all solid was completed, the reaction mixture was drowned in ice water, the solid separated in a centrifuge, washed neutral with water, and dried in vacuo over sodium hydroxide. Yield=9.85 g. If desired, the crude product thus obtained may be purified by recrystallizing from benzene.

EXAMPLE IX

*Phenyl Naphthalene-2,1-Diazooxide-5-Sulfonate*

To prepare this compound, 13.0 g. of naphthalene-2,1-diazooxide-5-sulfonyl chloride and 4.7 g. of phenol were dissolved in 100 ml. of dioxane, heated to 50°–60° C., and 20 ml. of 3 N-$Na_2CO_3$ added dropwise. Heating was continued for ½ hour after addition was complete. The reaction mixture was allowed to cool and stand overnight. Upon pouring into water, an oil separated, which crystallized after standing a short time. The product was recrystallized from isopropanol. Yield=8.5 g.

EXAMPLE X

*4,4'-Bis(Naphthalene-2,1-Diazooxide-5-Sulfonamido)-Biphenyl*

To prepare this compound, 27.0 g. of naphthalene-2,1-diazooxide-5-sulfonyl chloride was dissolved in 150 ml. of benzene. This solution was heated to 50° C., and to it was added a solution of 90.0 g. of benzidine and 8.5 ml. of pyridine in 250 ml. of benzene. The solution was stirred for an additional 15 minutes, cooled to room temperature, and the solid which separated was filtered off, washed with benzene, and sucked dry. The product was taken up in an NaOH solution, filtered into 100 ml. of 1:1 HCl, whereupon the product re-precipitated. The filtered solid was dissolved in acetone, re-precipitated with water, filtered and vacuum dried. Yield=11.2 g.

EXAMPLE XI

The diazo compound

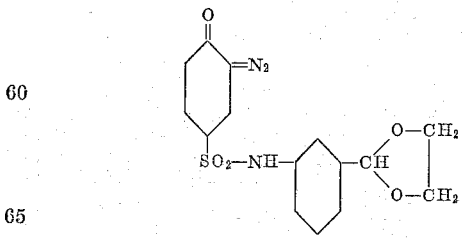

was prepared as follows:

(a) The starting material for the cyclic acetal diazo was m-nitrobenzaldehyde ethylene glycol acetal, prepared according to L. F. Fieser, M. Fields and S. Liebermann (J. Biol. Chem. 156, 191–201 (1944); C.A. 39: 72⁴² (1945).

(b) A solution of 33.4 g. (0.171 mole) of m-nitrobenzaldehyde ethylene glycol acetal in 200 ml. of isopropyl alcohol was shaken at about 45° C. with hydrogen and platinum oxide. After two hours and twenty minutes approximately the theoretical amount of hydrogen had been absorbed and the catalyst was removed by filtration. The solution of m-aminobenzaldehyde ethylene glycol acetal was used in the next step without further purification.

(c) 14 g. of naphthalene-2,1-diazooxide - 5 - sulfonic acid was added portionwise to 100 ml. of chlorosulfonic acid, adding Dry Ice as needed to maintain the temperature at 30–45° C. After addition of all solid was completed, the reaction mixture was drowned in ice water, the solid separated in a centrifuge, washed neutral with water, and dried in vacuo over sodium hydroxide. Yield=9.85 g. If desired, the crude product thus obtained may be purified by recrystallizing from benzene.

(d) A mixture of the solution from (b), 22.6 g. of potassium carbonate, and 43 ml. of water was cooled to 0.10° C. To the stirred mixture a warm solution of 45.0 g. of recrystallized 6(5)-diazo-5(6)-oxo-1-naphthalene-sulfonyl chloride in 165 ml. of dioxane was added dropwise over forty minutes. The mixture was then warmed to 25° C. and stirred at this temperature for three hours. It was then poured into about 1200 ml. of stirred ice water. The yellow solid which precipitated was collected by filtration and treated with 900 ml. of water and 10 ml. of sodium hydroxide. Insolubles were removed by filtration and the product was precipitated with 30 ml. of concentrated hydrochloric acid. A second extraction of the alkali-insoluble material with aqueous sodium hydroxide followed by filtration and acidification gave additional product which was combined with the first fraction. The product was filtered, washed with water, and dried under reduced pressure. The yield was 41.4 g. of material which melted at 93–99° C.

EXAMPLE XII

*N,N'-Ethylenebis-(p-Ethylaminobenzenediazonium Chloride-Zinc Chloride Complex)*

To prepare this compound, 242.0 g. of N-ethylaniline was heated for several hours at about 94° C. with 94 g. of ethylene bromide. The product was taken up in isopropanol, fitered and precipitated with water. The brown solid was recrystallized from isopropanol-water, dried, dissolved in concentrated HCl (0.5° C.), nitrosated, reduced with zinc dust, and diazotized with sodium nitrite. The diazo, when isolated as the zinc chloride complex, was initially a tar, but hardened after standing overnight into a crystalline solid, which was vacuum dried. Yield=25.9 g.

EXAMPLE XIII

*N,N'-Trimethylenebis-(p-2-Hydroxyethylaminobenzenediazonium Chloride-Zinc Chloride Complex)*

To prepare this diazo, 57.2 g. of 1,3-bis(N-2-hydroxyethylanilino) propane was dissolved in concentrated HCl, cooled to 0.5° C. and 65.0 ml. of 5 molar NaNO₂ added dropwise. The resulting deep red solution was allowed to warm up to 30° C., concentrated HCl was added, and zinc dust added (while maintaining the temperature below 50° C.) until the solution became colorless. The solution was cooled to 0.5° C., and NaNO₂ added until diazotization was complete. After isolation as the zinc chloride complex, the dried product weighed 79.8 g.

EXAMPLE XIV

*p,p'-(1,4-Piperazylene)Bis(Benzenediazonium Chloride-Zinc Chloride Complex)*

To prepare this diazo, 26.1 g. of N,N'-diphenylpiperazine was dissolved in hydrochloric acid, the solution cooled to 0.5° C., and 100 ml. of 2.5 molar NaNO₂ added dropwise. After warming the solution to 30° C., zinc dust was added until the solution was almost colorless. The resulting solution was cooled to 0.5° C., made acid to Congo red paper, and diazotized with NaNO₂. (After isolation as the zinc chloride complex, the dried diazo compound weighed 11.5 g.)

EXAMPLE XV

*2,2'-Ethylenedioxybis-(4-Diethylaminobenzene-Diazonium Chloride-Zinc Chloride Complex*

To prepare this diazo compound, a 50/50 ethanol-water solution of 33.0 g. of m-diethylamino-phenol, 18.8 g. of ethylene bromide, and 8.0 g. of NaOH was refluxed at 82° C. for 16 hours, after which the solution was poured into two liters of distilled water. The resulting oil hardened into a semi-solid after three days' refrigeration. After recrystallization from methanol, 7 g. of product was obtained, which was nitrosated, reduced and diazotized as above. Yield=4.7 g.

EXAMPLE XVI

The diazo sulfonate

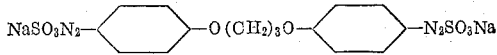

was prepared as follows:

p,p'-(1,3 - trimethylenedioxy)dianiline dihydrochloride (prepared from the base obtained by catalytic reduction of 1,3-bis-p-nitrophenoxypropane, which in turn was obtained by the interaction of 1,3-dibromopropane and sodium p-nitrophenoxide) was diazotized by adding dropwise 52 ml. of sodium nitrite solution (30%) over one hour to a stirred mixture of 36.0 g. of the above dihydrochloride, 152 ml. of concentrated hydrochloric acid and 130 ml. of water at 0–5° C. Fifteen minutes later the excess of nitrous acid was destroyed with sulfamic acid and 17 ml. of zinc chloride solution, 54%, was added dropwise. After being stirred cold and in the dark for about one hour, the resulting precipitate was collected by filtration, washed with alcohol, then ether, and dried under reduced pressure. The product, the zinc chloride-diazo complex, amounted to 44.4 g., a yield of 84%.

The conversion to the diazosulfonate was effected by stirring together 25.9 g. of sodium metabisulfite, 80 ml. of water, 24.5 ml. of sodium hydroxide solution, 40%, and 19.5 g. of sodium bicarbonate in that order. The whole was cooled to 5–10° C. and treated over about two hours with vigorous stirring with 44.4 g. of the above zinc chloride-diazo complex. Sodium bicarbonate solution, 5%, was added as required to keep the mixture alkaline to Brilliant Yellow. When the addition was complete the whole was stirred for one hour and then filtered. The crude product was washed with sodium chloride solution and redissolved in 3400 ml. of water at 50° C. The purified diazosulfonate was obtained by filtering this solution, adding 95 g. of salt, filtering the yellow product and drying under reduced pressure. The yield was 39.3 g. or 89%.

The following examples show methods of preparing the printing plates by the use of the diazo and the coupling compounds of our invention.

EXAMPLE XVII

A wet strength paper stock containing a formaldehyde-insolubilized gelatin-baryta surface layer was coated with an aqueous solution containing about 4% of a partially acetoacetylated polyvinyl alcohol (12% acetoacetylization) and about 3% of the diazo compound of the following structure:

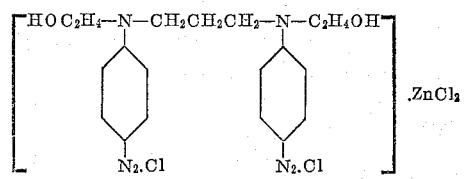

and 3% citric acid. After coating, the layer was dried with hot air from a fan, exposed beneath a positive original, and developed with ammonia vapor. A deeply colored sepia dye was formed in the unexposed parts. The layer was moistened with water and rolled up with printing reproduction comprising a water-receptive base having a coating thereon comprising a mixture of a diazo compound and a polymeric coupling compound selected from the group consisting of polyvinyl acetoacetate, polyvinyl acetate-acetoacetate, the acetoacetic ester of hydroxyethyl cellulose and the reaction product of the copolymer of polyvinyl methyl ether and maleic anhydride with the compound

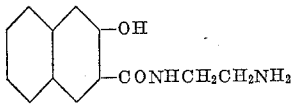

2. The light-sensitive element as defined in claim 1 wherein the diazo compound is selected from the class consisting of water-insoluble diazo sulfonates, water-insoluble diazo oxides and water-soluble bifunctional diazonium compounds.

3. A light-sensitive element for use in photomechanical reproduction comprising a water-receptive base having a coating thereon comprising a mixture of polyvinyl acetoacetate and the diazo compound

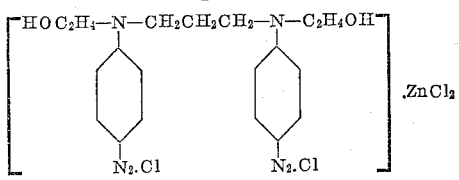

4. A light-sensitive element for use in photomechanical reproduction comprising a water-receptive base having a coating thereon comprising a mixture of polyvinyl acetoacetate and the diazo compound

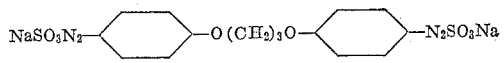

5. A light-sensitive element for use in photomechanical reproduction comprising a water-receptive base having a coating thereon comprising a mixture of polyvinyl acetoacetate and the diazo compound

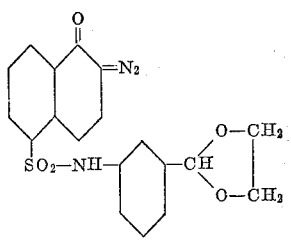

6. A light-sensitive element for use in photomechanical reproduction comprising a water-receptive base having a coating thereon comprising a mixture of polyvinyl acetoacetate and the diazo compound

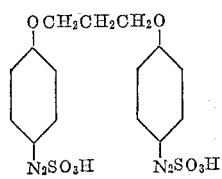

7. A light-sensitive element for use in photomechanical reproduction comprising a water-receptive base having a coating thereon comprising a mixture of polyvinyl acetoacetate and the diazo compound

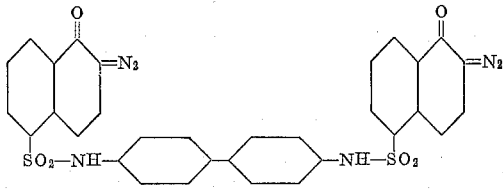

8. A light-sensitive element for use in photomechanical reproduction comprising a water-receptive base having a coating thereon comprising a mixture of polyvinyl acetate-acetoacetate and the diazo compound

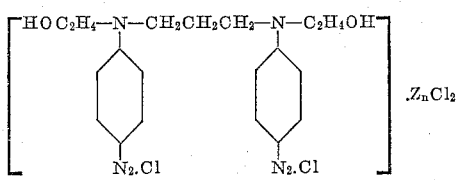

9. A light-sensitive element for use in photomechanical reproduction comprising a water-receptive base having a coating thereon comprising a mixture of the diazo compound

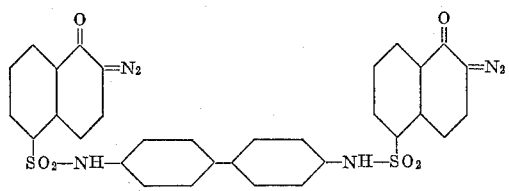

and the reaction product of the copolymer of polyvinyl methyl ether and maleic anhydride and

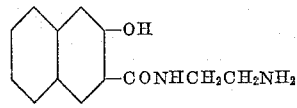

References Cited in the file of this patent

UNITED STATES PATENTS

| | | |
|---|---|---|
| 2,405,523 | Sease et al. | Aug. 6, 1946 |
| 2,498,722 | Straley | Feb. 28, 1950 |
| 2,551,133 | Jennings | May 1, 1950 |
| 2,661,291 | Slifkin | Dec. 1, 1953 |
| 2,772,972 | Herrick et al. | Dec. 4, 1956 |
| 2,854,338 | Herrick et al. | Sept. 30, 1958 |
| 2,923,703 | Brunl et al. | Feb. 2, 1960 |
| 2,940,852 | Herrick et al. | June 19, 1960 |
| 3,046,120 | Schmidt et al. | July 24, 1962 |
| 3,050,387 | Neugebauer et al. | Aug. 21, 1962 |
| 3,061,430 | Uhlig et al. | Oct. 30, 1962 |

FOREIGN PATENTS

| | | |
|---|---|---|
| 875,437 | Germany | May 4, 1953 |

UNITED STATES PATENT OFFICE
CERTIFICATE OF CORRECTION

Patent No. 3,149,972

September 22, 1964

Clifford E. Herrick, Jr., et al.

It is hereby certified that error appears in the above numbered patent requiring correction and that the said Letters Patent should read as corrected below.

Column 7, line 55, for "57.2 g." read -- 47.2 g. --.

Signed and sealed this 16th day of November 1965.

(SEAL)
Attest:

ERNEST W. SWIDER
Attesting Officer

EDWARD J. BRENNER
Commissioner of Patents